US011761862B1

(12) United States Patent
Materi et al.

(10) Patent No.: US 11,761,862 B1
(45) Date of Patent: Sep. 19, 2023

(54) SYSTEM FOR SELECTING AND PROCESSING DNA FROM AGAROSE GELS AND METHODS OF USE THEREOF

(71) Applicants: Bryan Materi, Hermitage, TN (US); Abigail Collins, Cookeville, TN (US)

(72) Inventors: Bryan Materi, Hermitage, TN (US); Abigail Collins, Cookeville, TN (US)

( * ) Notice: Subject to any disclaimer, the term of this patent is extended or adjusted under 35 U.S.C. 154(b) by 361 days.

(21) Appl. No.: 16/849,945

(22) Filed: Apr. 15, 2020

Related U.S. Application Data

(60) Provisional application No. 62/834,179, filed on Apr. 15, 2019.

(51) Int. Cl.
*G01N 1/00* (2006.01)
*G01N 1/28* (2006.01)

(52) U.S. Cl.
CPC ..... *G01N 1/286* (2013.01); *G01N 2001/2873* (2013.01)

(58) Field of Classification Search
None
See application file for complete search history.

(56) References Cited

U.S. PATENT DOCUMENTS

2005/0120855 A1\* 6/2005 Shu .................. A61B 17/32053
83/123

\* cited by examiner

*Primary Examiner* — Jyoti Nagpaul
(74) *Attorney, Agent, or Firm* — Patterson Intellectual Property Law, P.C.; Mark A. Kilgore (57) ABSTRACT

A device used to cut lanes and bands from an agarose gel is provided. The instrument uses cutting edges to separate DNA in lanes as well as in bands to allow for easier processing of separated DNA. This device also allows for standardization of the sizes of cut bands so that less is wasted.

19 Claims, 7 Drawing Sheets

SYSTEM FOR SELECTING AND PROCESSING DNA FROM AGAROSE GELS AND METHODS OF USE THEREOF

CROSS-REFERENCES TO RELATED APPLICATIONS

This application claims the benefit of the following patent application which is hereby incorporated by reference: Provisional Ser. No. 62/834,179 filed on Apr. 15, 2019.

METHODS OF USE THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND SUMMARY

The present invention relates generally to a system for selecting and processing DNA from agarose gel. More particularly, this invention pertains to visualization and cutting devices which help in agarose gel analysis by making the visualization and the cutting and the removal of DNA from the gel more efficient and accurate.

In a microbiology lab, imaging gels are typically done with a transilluminator, which sits on a bench top and is non-mobile. These devices are typically large, bulky, and are not amenable to repeated and consistent mobility around the lab space. Some devices could also include a camera and/or computer system attached to the device, as well as use UV or blue lights. To use a transilluminator or similar device for imaging gels, the gel is placed on top of the device, a light or some illumination device is turned on, and the DNA in the gel can be visualized either by the naked eye or through some filter. At this point, the DNA of interest can be removed from the gel by the use of a razor blade and placed into a tube for DNA extraction. Use of the transilluminator can be problematic when it comes to use of UV lights in that the DNA is degraded to a point where only about 1% is usable after being subjected to the UV radiation, which takes approximately 30 seconds of UV exposure to cause such degradation. This is a major issue where post processing of the DNA is needed; however, blue light instead of UV light can be used with certain dyes to overcome this issue, though not all photoreactive dyes used for DNA imaging react to blue light. Further in post processing methods, gel extraction kits use gel dissolving fluids that use an amount of fluid based on the weight of the gel piece cut. Using a razor blade to cut these pieces out is not exact and widely varying amounts of gel are excised along with the DNA. Additionally, the use of a razor blade presents a sharps hazard to the user.

What is needed, then, is a device which 1) makes the imaging of a gel easier by having less chance of DNA degradation and by decreasing chances of sample contamination (e.g. dropping the sample), and 2) standardizes the method of DNA extraction from the gel to allow for less usage of gel extraction reagents and more consistent results.

BRIEF SUMMARY

This disclosure includes the description of one embodiment including a gel cutting device having a lane cutter including a body. The body may include a top surface and a bottom surface, an opening disposed within the body and extending from the top surface to the bottom surface. The body may further include a cutting surface disposed about the bottom surface, wherein the cutting surface may be adjacent the opening. The body may include a handle disposed about the body.

In some embodiments, the device may include the body further having a flange disposed about the top surface.

In some embodiments, the flange may include an upper surface that is within the same plane as at least a portion of the top surface of the body.

In some embodiments, the flange may include an upper surface, wherein the upper surface may include a plane that is parallel with but offset from a plane of the top surface of the body.

In some embodiments, the handle may be disposed about a first end of the body.

In some embodiments, the body may also include a second end opposite the first end, wherein the second end may include a second handle.

In some embodiments, at least a portion of the cutting surface may be disposed about the intersection of the bottom surface and the opening.

In some embodiments, the body may further comprise an exterior portion. The exterior portion may be tapered toward the bottom surface such that the taper may comprise at least a portion of the cutting surface.

In some embodiments, the body may further comprise a cavity, wherein the cavity may be adjacent the opening.

In some embodiments, a wall may separate the cavity from the opening. The wall may include at least one aperture communicating the cavity with the opening.

In some embodiments, the cavity may further include an illumination source disposed about the cavity and configured to illuminate the opening via the at least one aperture.

In some embodiments, a gel cutting device may include a lane cutter. The lane cutter may include a body having a top surface and a bottom surface. The body may include an opening disposed within the body and extending from the top surface to the bottom surface. The body may further include a cutting surface disposed about the bottom surface, wherein the cutting surface may be adjacent the opening. The lane cutter may also include a handle disposed about the body. In some embodiments, the gel cutting device may further include a band cutter comprising two opposing blade portions which may include a first blade and a second blade. The first blade and second blade may be hingedly connected. Each of the first blade and second blade may include a handle portion. In some embodiments, the band cutter may be configured to fit within the opening of the lane cutter.

In some embodiments, the body may include a flange disposed about the top surface.

In some embodiments, the handle of the lane cutter may be disposed about a first end of the body. In some embodiments, the body may include a second end opposite the first end wherein the second end may include a second handle.

In some embodiments, at least a portion of the cutting surface may be disposed about the intersection of the bottom surface and the opening.

In some embodiments, the band cutter may be hingedly attached via a biasing member configured to bias the two blades toward each other.

In some embodiments, the biasing member may include two biasing members, each of the two biasing members being connected to the first blade and second blade. The two biasing members may be positioned such that an aperture may be disposed between the two biasing members. In some embodiments, a line of sight may be disposed along a central axis of the band cutter and between the two blade portions.

In some embodiments, the body may include a cavity wherein the cavity may be adjacent the opening.

In some embodiments, a wall may separate the cavity from the opening, wherein the wall may include at least one aperture communicating the cavity with the opening.

In some embodiments, the cavity may include an illumination source disposed about the cavity and configured to illuminate the opening via the at least one aperture.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the system or devices of the present disclosure may be made of any appropriate or suitable material including, but not limited to, metal, alloy, polymer, polymer mixture, wood, composite, or any combination thereof.

Figure 1:
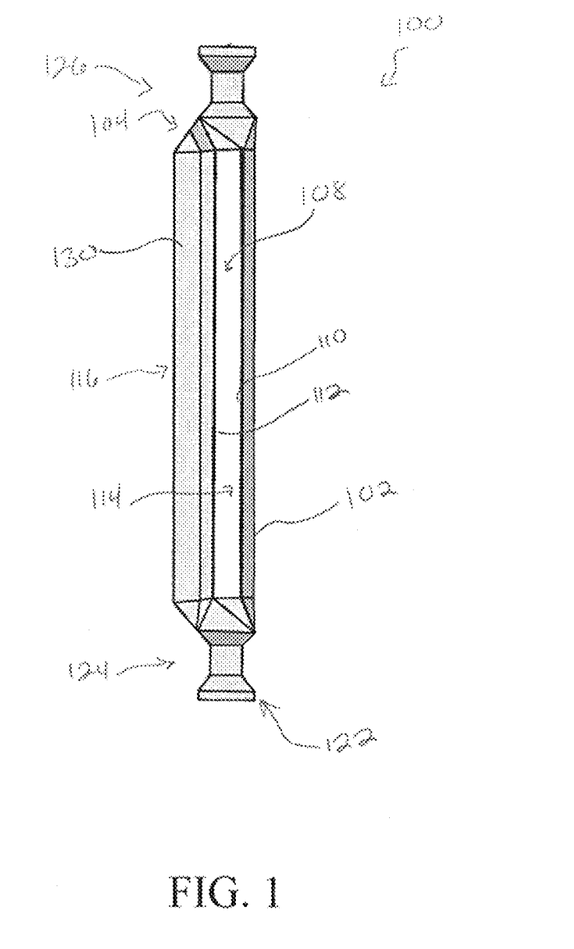
FIG. 1 is an embodiment of a lane cutter of the present disclosure
Figure 4A:
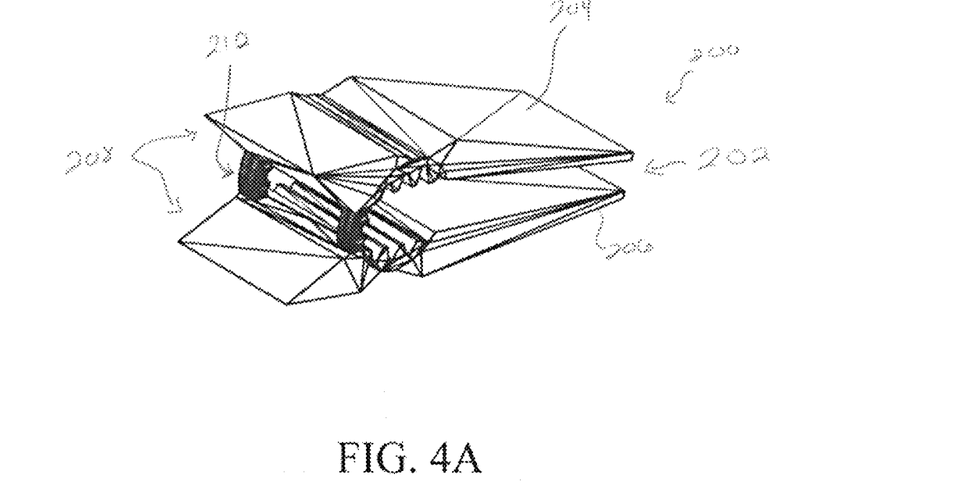
FIGS. 4A-C are embodiments of a band cutter of the present disclosure.
Figure 4B:
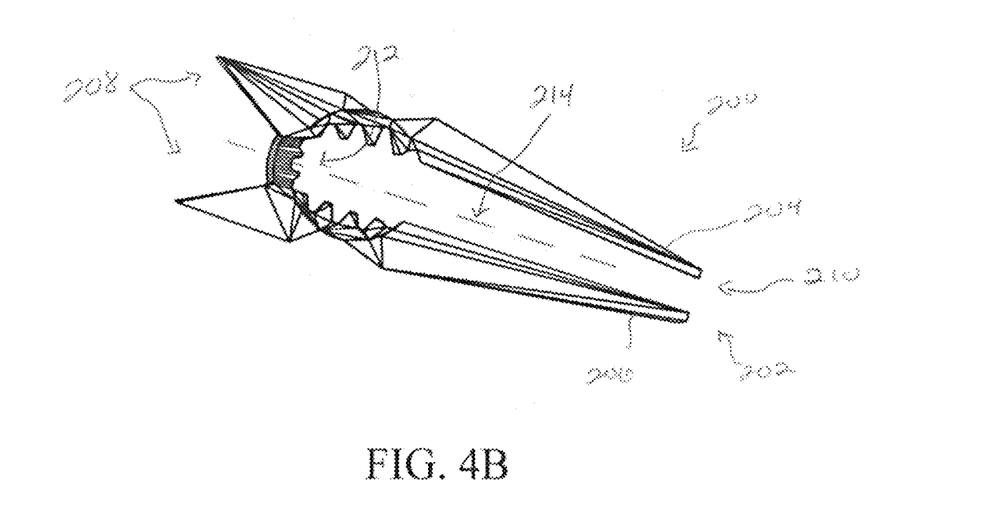
Figure 4C:
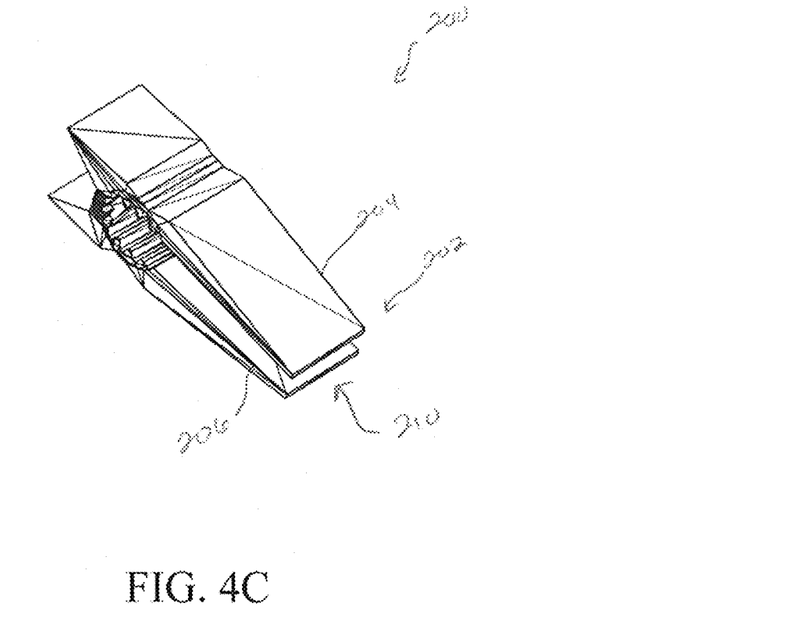

Embodiments of the present disclosure may include a simple, quick, and precise system and method for selecting and cutting DNA from an agarose gel. As shown in FIGS. 1 and 4, the system may consist of 2 devices, a lane cutter (FIG. 1) and a band cutter (FIG. 4). In some embodiments, the lane cutter and band cutter are designed to be used in conjunction with each other, while in other embodiments, each may be used individually. In some embodiments, each device may be constructed from plastic, metal, polymer, composite, and the like. In some embodiments, each device may be constructed of a polymer or polymer composite, including, but not limited to, high-density polyethylene (HDPE), polypropylene, polystyrene, polyvinyl chloride, polyamides, polyesters, polyurethanes, polylactic acid, and the like. In some embodiments, the composition of the devices may be suitable as a plastic which can be utilized via a 3D printer assembly. It will be obvious to those skilled in the art that other plastic materials may also be used.

Figure 2:
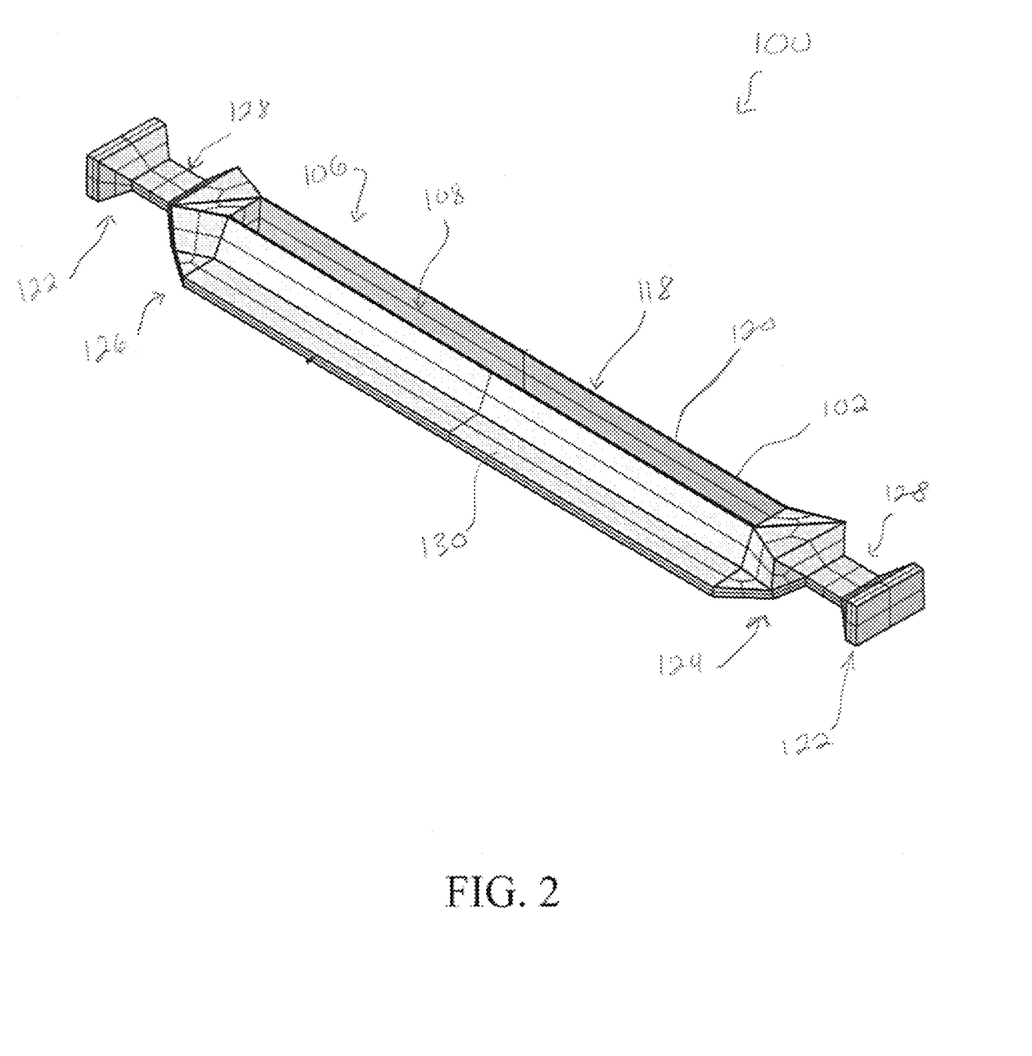
FIG. 2 is a perspective view of an embodiment of a lane cutter of the present disclosure.

Referring to FIGS. 1 and 2, the lane cutter 100 may allow for easier cutting of a single lane of a gel. In one embodiment, the lane cutter 100 may include a body 102. The body 102 may include a top surface 104 and a bottom surface 106. The body 102 may also include an opening 108 which extends entirely from the top surface 104 to the bottom surface 106, thus creating a complete void that is communicated on the top surface 104 and bottom surface 106 with the external environment. The opening 108 may be configured to allow the lane cutter 100 to cut and extract a given lane of a gel so that the gel, and/or its contents, may be processed and analyzed. To cut and extract a lane of a gel, the lane cutter 100 may be placed such that the opening 108 within the body 102 corresponds to the selected lane for cutting and extraction. The lane cutter 100 may be depressed into the gel until the bottom surface 106 of the body 102 has passed through the gel, thus effectively cutting and separating the selected lane from the remaining gel. The lane cutter 100 may then be retracted back out of the gel removing with it the selected lane.

The bottom surface 106 of the lane cutter 100 which contacts the gel may be configured so that it effectively and precisely cuts the gel. It will be understood by those skilled in the art that the distance between two adjacent lanes in a gel may be very small. In some instances, the distance may be only 1 or 2 millimeters or less. In other instances, the distance may be up to 5 millimeters. Thus, it is understood that the lane cutter 100 may be configured to cut a lane without disturbing or destroying an adjacent lane such that the adjacent lane may remain intact and/or usable for extraction and/or analysis.

As depicted in FIG. 1, the body 102 may be comprised of an opening 108 wherein the opening is located between two substantially parallel walls 110, 112. It will be understood that "substantially parallel" as used herein will mean parallel within manufacturing tolerances. Such a configuration may create an interior portion 114 of the body 102 including the two substantially parallel walls 110, 112 and the opening 108, and an exterior portion 116 of the body. In this embodiment, the selected lane when extracted may be disposed in the opening 108 and held between the two parallel walls 110, 112.

Referring now to FIG. 2, in some embodiments, the bottom surface 106 may include a cutting surface 118. The cutting surface 118 may be disposed at a position adjacent the opening 108. Generally, at least a portion of the cutting surface 118 may be disposed about the intersection of the bottom surface 106 and the opening 108. In some embodiments, the exterior portion 116 of the body 102 may be tapered toward the bottom surface 106 such that the taper creates at least a portion of the cutting surface 118. In some embodiments, the cutting surface 118 may include a contact edge 120. The contact edge 120 may have a thickness such that it precisely cuts between adjacent lanes of a gel. In one embodiment, the thickness may be between 0.1 millimeters and 4.0 millimeters. In another embodiment, the thickness may be between 0.5 millimeters and 2.0 millimeters. In yet another embodiment, the thickness may be approximately 1.0 millimeters.

In some embodiments, the bottom surface 106 may include two cutting surfaces 118. Each cutting surface 118 may be present where each wall 110, 112 of the opening 108 intersects the bottom surface 106 of the body 102. Thus, in some embodiments, the body 102 may include two substantially parallel cutting surfaces 118 that align with the two substantially parallel walls 110, 112.

In some embodiments, the opening 108 of the lane cutter 102 may have a length that is longer than the length of the gel being cut. A configuration as disclosed may allow for the entire length of the gel corresponding with the lane to be cut and extracted from the remaining portions of the gel. In some embodiments, the opening 108 within the body 102 may have a length that is shorter than the length of the gel. In such embodiments, the bottom surface 106 may include four (4) cutting surfaces. In some embodiments, the opening may have a rectangular shape corresponding to four (4) contact edges with the gel. As described above, each of the four (4) cutting surfaces may be configured to cut the gel in the same manner as the two previously described cutting surfaces.

In some embodiments, the lane cutter 100 may include at least one handle 122 disposed about the body 102. The handle 122 may be configured for a user to grasp while operating the device. In one embodiment, the lane cutter may include two handles 122, each handle being located at opposite ends 124, 126 in relation to each other along the lane cutter's 100 length. Each handle 122 may include a depression area 128 which allows for the user to contact the handle and depress the lane cutter 100 into the gel. The depression area 128 may allow for better tactile feel and easier manipulation of the cutter 100 during the precision cutting movement of the lane cutter.

In some embodiments, the body 102 of the lane cutter 100 may also include a flange 130 that may be disposed about the body. In some embodiments, the flange 130 may be located about the body 102 at a height such that the lane cutter 100 may be pressed into the gel to cut through the gel without the flange impeding the cutter's ability to be pressed into the gel. In some embodiments, the height of the flange 130 may be located at a distance such that the flange may not contact the gel. In such a configuration, preventing, or substantially preventing, contact with the gel may keep the gel from distorting or disrupting the adjacent lane to the lane of interest during the cutting process. In some embodiments, the flange 130 may be located such that any contact with the gel by the flange causes only minimum distortion to the gel or any lanes. In some embodiments, the flange 130 may be disposed about the top surface 104. In some embodiments, the flange 130 may include an upper surface that is within the same plane as at least a portion of the top surface 104 of the body 102. Thus, at least a portion of the top surface 104 and the upper surface of the flange 130 are within the same plane. In some embodiments, the upper surface of the flange 130 may have a plane that is parallel with but offset from the plane of the top surface 104 of the body 102.

Figure 5:
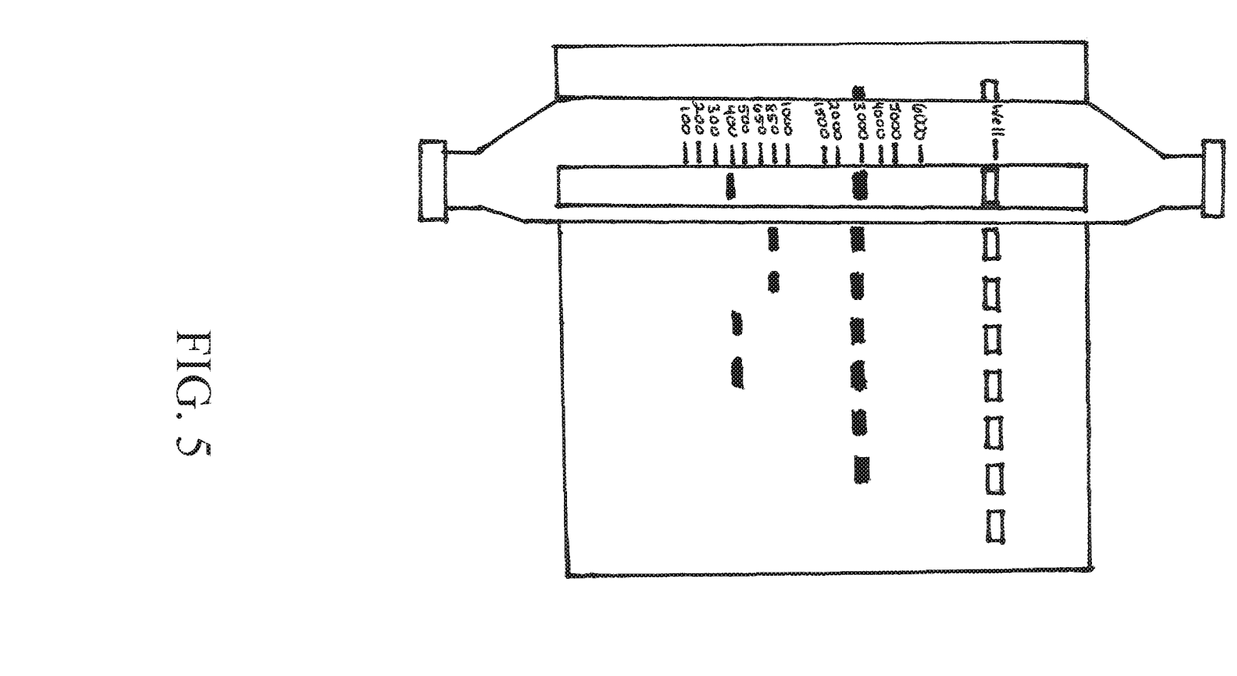
FIG. 5 is an illustration of a lane cutter disposed above a lane of an agarose gel.
Figure 6:
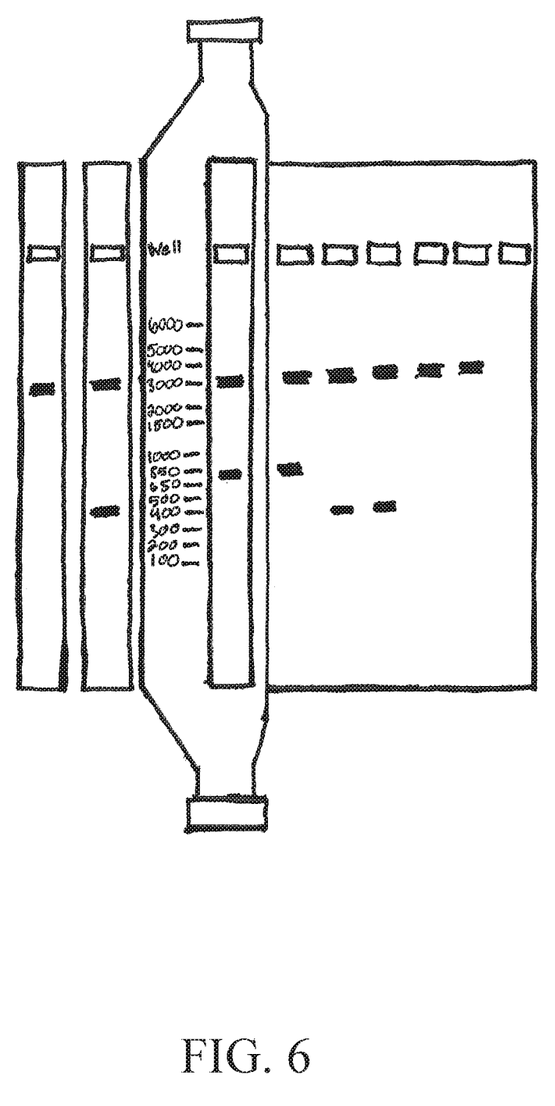
FIG. 6 is an illustration of a gel with one lane having been extracted and a second lane cut utilizing the lane cutter.

In some embodiments, the flange 130 may allow for a DNA ladder to be labeled or marked along the length of the extension, therefore allowing the user to identify the labeled bands of the extracted lane. This configuration may allow for the DNA band within the gel to be easily aligned and identified with the DNA ladder by the user. As shown in FIGS. 5 and 6, the extension 130 may be labeled or marked with a DNA ladder for identifying corresponding labeled bands in the gel lane. It will be understood by those skilled in the art that the flange should be of sufficient size to allow for adequate labeling or marking of the DNA ladder. In some embodiments, the use of the markings may be temporary such that with each new gel that is processed, a new DNA ladder can be marked accordingly. In some embodiments, the DNA ladder may be marked with a pen or other writing device. In some embodiments, the DNA ladder may be a pre-made label that is adhered to the flange 130.

Referring now to FIGS. 4A-C, the gel cutting system may also include a band cutter 200. The band cutter 200 may be configured to fit inside the opening 108 of the lane cutter 100. In some embodiments, once the lane cutter 100 has extracted a lane from the gel, the band cutter 200 may be inserted into the opening 108 of the lane cutter to remove a band or a set of bands from the extracted lane. In some embodiments, the extracted lane may be removed from the lane cutter 100 and then the band cutter 200 may be positioned to cut a band or set of bands from the extracted lane. Removal of a band may allow for the DNA contained within the band to be processed for further analysis. Generally, the band cutter 200 may have at least a cutting surface similar to that of the lane cutter 100 such that the band cutter can cut a band from the lane with precision and ease. Additionally, the band cutter 200 may have a hinged portion allowing for the cutter to be open and closed for easier extraction and processing of the band.

In some embodiments, the band cutter 200 may be made of a single piece or may be made of multiple pieces connected together. In some embodiments, the band cutter 200 may include two opposing blade portions 202 which may comprise a first blade 204 and a second blade 206. In some embodiments, the first blade 204 and second blade 206 may be hingedly connected. Each blade 204, 206 may include a handle portion 208 which may be configured such that the user may grasp the handle portions and operate the band cutter 200. In some embodiments, a portion of each blade 204, 206 may be tapered toward its cutting edge 210. The cutting edge 210 may be of a thickness such that it precisely cuts between the adjacent bands of a lane. In one embodiment, the thickness may be between 0.1 millimeters and 4.0 millimeters. In another embodiment, it may be between 0.5 millimeters and 2.0 millimeters. In yet another embodiment, it may be approximately 1.0 millimeters.

In some embodiments, a hinged connection 210 between the first blade 204 and second blade 206 may include a biasing member which may bias the band cutter 200 to a closed position, i.e., where the two blades 204, 206 are biased toward each other. When a force is applied to the handles 208, the handles may be caused to be moved toward each other and the blades 204, 206 may be caused to move away from each other. In one embodiment, the biasing member may be integral to the band cutter 200. The band cutter 200 may be made of a material that may cause the cutter to be biased to a closed position. For example, in one embodiment the material may include plastic, polymer, composite, or the like. In another embodiment, the biasing member may include a spring or coil.

In some embodiments, the band cutter 200 may include two biasing members 212 located adjacent to each other. Each biasing member 212 may be connected to the first blade 204 and the second blade 206. In some embodiments, the biasing members 212 may be configured such that an aperture is disposed between the biasing members. The aperture may be positioned to allow a line of sight from the one side of the cutter to another side of the cutter along the length. In some embodiments, the line of sight may be used to allow a user to view the gel through the band cutter 200 and precisely position the cutter along the band that is being extracted. The aperture may allow the user to look directly through the band cutter 200 and align the cutting edges 210 with the perimeter of the band to be extracted with precision and ease. In some embodiments, the aperture is disposed about the central axis 214 of the band cutter 200.

Figure 3:
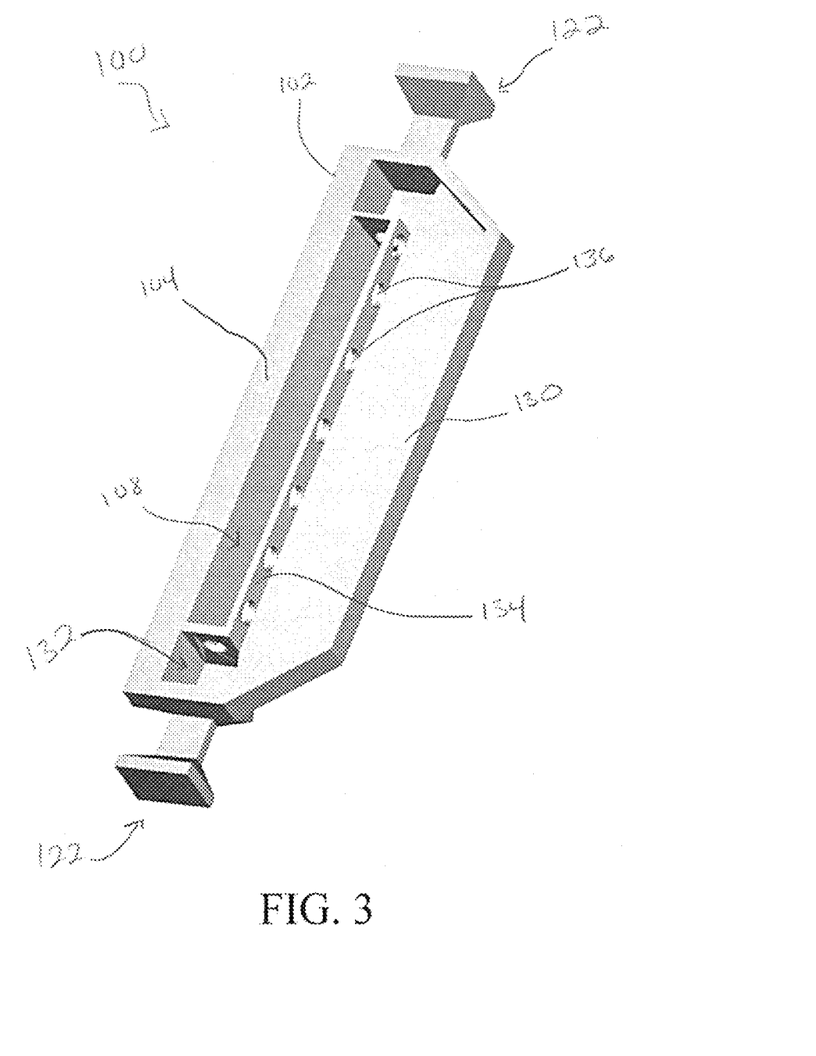
FIG. 3 is a perspective view of an embodiment of a lane cutter with a cavity for an illumination source.

Referring now to FIG. 3, the lane cutter may also include an illumination source. In one embodiment, the illumination source may include light emitting diodes (LEDs). The use of the illumination source may allow for visualization of DNA bands in the gel lanes if a dye is added to the gel, such as SYBR safe®. Use of the illumination source may eliminate the need for UV light, which is normally used in the prior art to visualize the DNA bands. Generally, UV light as used in the prior art causes degradation of the DNA. By using an illumination source and dye for visualization, the DNA is not subject to degradation and may be retained in its natural state allowing for greater efficacy when processed and analyzed. In some embodiments, the LED lights may be located in the body 102 of the lane cutter 100 adjacent the opening 102 so that the light may be transmitted to the gel and illuminate the DNA bands. In some embodiments, the body 102 may include a cavity 132. The cavity 132 may be configured to house the illumination source, or at least a portion of the illumination source. In some embodiments, the cavity 132 may be adjacent the opening 108. In some embodiments, a wall 134 may separate the cavity 132 from the opening 108. In some embodiments, a plurality of walls may separate the cavity 132 from the opening 108. In some embodiments, the wall 134 or plurality of walls may include at least one aperture 136 communicating the cavity 132 with the opening 108. The aperture 136 or apertures may be configured to allow the illumination source to transmit light from the illumination source to the opening 108. For example, in one embodiment, an LED may be disposed about the aperture 136 such that the LED may be illuminated, and the light will be transferred through the aperture 136 and into the opening 108. In some embodiments, the illumination source may be disposed about the cavity 132. In some embodiments, the cavity 132 may also include a cover such that the cavity and the illumination source may not be exposed to the external environment.

In some embodiments, the illumination source may require a power source. The power source may include battery power or electrical current via a wall outlet. Other power sources known in the art may be used as well. In some embodiments, the power source may be integral with the illumination source or may be separate. In some embodiments, the power source may be disposed within the cavity 132.

It will be understood by those skilled in the art that other embodiments of this device may include changes in the length and the width of the lane cutter 100 and changes in the width of the band cutter 200. A change in length of the lane cutter 100 may allow for different size gels based on standard template sizes. A change in width for the lane cutter 100 and corresponding band cutter 200 may allow for the number of lanes to be extracted to be increased. In some embodiments, the number of lanes to be extracted may be one (1). In some embodiments, the number of lanes to be extracted may be two (2) or more.

In addition to the devices and embodiments described above, a method for selecting and processing DNA from agarose gels is also disclosed. The methods and devices for preparing, loading, and running DNA in agarose gel are known in the art. The method of this invention may comprise providing an agarose gel with at least one lane including at least one DNA segment of interest. The agarose gel may be run as known in the prior such that the DNA is separated by size. The lane cutter may be positioned adjacent the DNA ladder such that a copy of the DNA ladder may be transcribed to the flange portion of the lane cutter body. A lane of the agarose gel may be selected for cutting and extraction. In some embodiments, the lighted portion of the lane cutter may be powered on. The lane cutter may be positioned over the selected lane which includes the DNA band of interest. The lane cutter may be pressed into the agarose gel such that the lane is disposed in the opening of the lane cutter. The band cutter may then be positioned and inserted into the agarose gel to extract the DNA band of interest. In some embodiments, the land cutter may be pressed into the agarose gel and then removed such that the length of the entire lane is extracted with the lane cutter. The band cutter may then be positioned over the DNA band of interest and then inserted into the gel. The band cutter may then be extracted such that the DNA band of interest is extracted with the band cutter. The DNA band of interest located in the gel extraction may then be processed.

Thus, although there have been described particular embodiments of the present invention of a new and useful SYSTEM FOR SELECTING & PROCESSING DNA FROM AGAROSE GELS AND METHODS OF USE THEREOF it is not intended that such references be construed as limitations upon the scope of this invention except as set forth in the following claims.

What is claimed is:

1. A gel cutting device comprising:
   a lane cutter including a body having a top surface and a bottom surface, an opening having a length and disposed within the body and extending from the top surface to the bottom surface, a cutting surface disposed about the bottom surface, the cutting surface being adjacent the opening, a handle disposed about the body, and a flange disposed about the top surface wherein the flange is adjacent the opening and extends at least partially the length of the opening.

2. The device of claim 1, wherein the flange has an upper surface that is within the same plane as at least a portion of the top surface of the body.

3. The device of claim 1, wherein the flange has an upper surface, the upper surface having a plane that is parallel with, but offset from a plane of the top surface of the body.

4. The device of claim 1 wherein the handle is disposed about a first end of the body.

5. The device of claim 4 wherein the body further comprises a second end opposite the first end, the second end including a second handle.

6. The device of claim 1 wherein at least a portion of the cutting surface is disposed about the intersection of the bottom surface and the opening.

7. The device of claim 6 wherein the body further comprises an exterior portion, the exterior portion being tapered toward the bottom surface such that the taper comprises at least a portion of the cutting surface.

8. The device of claim 1 wherein the body further comprises a cavity, the cavity being adjacent the opening.

9. The device of claim 8 wherein a wall separates the cavity from the opening, the wall having at least one aperture communicating the cavity with the opening.

10. The device of claim 9 wherein the cavity further comprises an illumination source disposed about the cavity and configured to illuminate the opening via the at least one aperture.

11. A gel cutting device comprising:
a lane cutter including a body having a top surface and a bottom surface, an opening disposed within the body and extending from the top surface to the bottom surface, a cutting surface disposed about the bottom surface, the cutting surface being adjacent the opening, and a handle disposed about the body; and
a band cutter comprising two opposing blade portions of a first blade and a second blade, the first blade and second blade being hingedly connected, each of the first blade and second blade having a handle portion, wherein the band cutter is configured to fit within the opening of the lane cutter.

12. The device of claim 11 wherein the body further comprises a flange disposed about the top surface.

13. The device of claim 11, wherein the handle is disposed about a first end of the body and wherein the body further comprises a second end opposite the first end, the second end including a second handle.

14. The device of claim 11, wherein at least a portion of the cutting surface is disposed about the intersection of the bottom surface and the opening.

15. The device of claim 11, wherein the band cutter is hingedly attached via a biasing member configured to bias the two blades toward each other.

16. The device of claim 15, wherein the biasing member comprises two biasing members, each of the two biasing members being connected to the first blade and second blade, the two biasing member positioned such that an aperture is disposed between the two biasing members and wherein a line of sight is disposed along a central axis of the band cutter and between the two blade portions.

17. The device of claim 11 wherein the body further comprises a cavity, the cavity being adjacent the opening.

18. The device of claim 17 wherein a wall separates the cavity from the opening, the wall having at least one aperture communicating the cavity with the opening.

19. The device of claim 18 wherein the cavity further comprises an illumination source disposed about the cavity and configured to illuminate the opening via the at least one aperture.

* * * * *